(12) United States Patent
Carey, III et al.

(10) Patent No.: US 12,364,372 B2
(45) Date of Patent: Jul. 22, 2025

(54) TOWEL FOR DRYING AN ANIMAL

(71) Applicants: Thomas Carey, III, Hudson, IL (US); Megan Dortenzo, Hudson, IL (US); Sophie Zerbib, Indianapolis, IN (US)

(72) Inventors: Thomas Carey, III, Hudson, IL (US); Megan Dortenzo, Hudson, IL (US); Sophie Zerbib, Indianapolis, IN (US)

( * ) Notice: Subject to any disclaimer, the term of this patent is extended or adjusted under 35 U.S.C. 154(b) by 672 days.

(21) Appl. No.: 17/531,745

(22) Filed: Nov. 20, 2021

(65) Prior Publication Data
US 2022/0079392 A1    Mar. 17, 2022

(51) Int. Cl.
*A47K 10/02*    (2006.01)
*A01K 13/00*    (2006.01)

(52) U.S. Cl.
CPC ............ *A47K 10/02* (2013.01); *A01K 13/001* (2013.01)

(58) Field of Classification Search
CPC .. A01K 13/001; A01K 13/006; A01K 13/008; A47K 10/02; A41D 15/04
USPC ........................................................ 119/850
See application file for complete search history.

(56) References Cited

U.S. PATENT DOCUMENTS

| | | | |
|---|---|---|---|
| 134,921 A * | 1/1873 | Morris | A01K 13/006 54/79.1 |
| 160,012 A * | 2/1875 | Franke | A01K 13/006 54/79.1 |
| 483,980 A * | 10/1892 | Gevers | A01K 13/008 54/79.2 |
| 1,639,156 A * | 8/1927 | Wilmert | A47D 15/008 5/494 |
| 2,003,435 A * | 6/1935 | Groff | A01K 13/006 54/79.1 |
| 2,222,705 A * | 11/1940 | Conlon | A01K 13/006 54/79.1 |
| 2,573,154 A * | 10/1951 | Martin | A01K 13/006 54/79.2 |
| 2,911,648 A * | 11/1959 | Schanda-Seyferth | A41D 15/04 2/85 |
| 3,742,679 A * | 7/1973 | Jordan | A01K 13/006 54/79.1 |
| 5,359,963 A * | 11/1994 | Jesse, Jr. | A01K 13/006 54/79.1 |
| 6,024,055 A * | 2/2000 | Jesse, Sr. | A01K 13/006 54/79.4 |

(Continued)

FOREIGN PATENT DOCUMENTS

| | | | | |
|---|---|---|---|---|
| CH | 674444 A5 * | 6/1990 | | A41D 15/00 |
| GB | 2278778 A * | 12/1994 | | A47K 10/02 |

(Continued)

*Primary Examiner* — Monica L Perry

(57) ABSTRACT

A towel is formed of an absorbent material for drying an object having one or more extensions protruding outward. The towel has a center portion and multiple extension panels extending from the center portion formed by a slit(s), resulting in each extension panel being independently moveable. Adjacent extension panels are optionally secured by a first and second means for securing such that the adjacent extension panels are removably connectable. In use, when placed over an object, e.g., a dog, for drying, the extension panels of the towel extend in length to the dog's paws and are used independently to dry the legs of the dog while allowing the remaining portions of the towel to remain in place over the dog.

20 Claims, 7 Drawing Sheets

(56) References Cited

U.S. PATENT DOCUMENTS

| | | | | |
|---|---|---|---|---|
| 6,058,890 | A * | 5/2000 | Harrell | A01K 13/006 54/79.1 |
| 6,223,696 | B1 * | 5/2001 | Murakami | A01K 13/006 119/850 |
| 6,499,165 | B1 * | 12/2002 | Morgillo | A47D 13/08 5/655 |
| 6,877,300 | B1 * | 4/2005 | Hathcock | A01K 13/008 54/79.2 |
| 7,003,825 | B1 * | 2/2006 | Levings | A47G 9/066 296/81 |
| 7,444,684 | B1 * | 11/2008 | Medina | A41D 7/008 2/48 |
| 7,581,514 | B2 * | 9/2009 | Bonfoey | A01K 13/006 119/850 |
| 9,131,734 | B2 * | 9/2015 | Daugherty | A41B 13/06 |
| 9,756,882 | B2 * | 9/2017 | Townsend | A41D 13/0012 |
| 10,681,997 | B1 * | 6/2020 | Rigas | A47C 31/11 |
| 11,344,396 | B2 * | 5/2022 | Levine | A01K 15/04 |
| 2002/0088410 | A1 * | 7/2002 | Burnett | A01K 13/006 119/850 |
| 2006/0174409 | A1 * | 8/2006 | Hermanson | A47G 9/0223 2/69.5 |
| 2007/0204808 | A1 | 9/2007 | Harada | |
| 2007/0234970 | A1 * | 10/2007 | Farzan | A01K 13/006 119/850 |
| 2007/0289558 | A1 * | 12/2007 | Bonfoey | A01K 13/006 119/850 |
| 2007/0295281 | A1 * | 12/2007 | Fortson | A01K 13/001 119/613 |
| 2009/0235871 | A1 * | 9/2009 | Andreas | A01K 13/006 119/653 |
| 2014/0116351 | A1 * | 5/2014 | Mansell | A01K 13/001 119/650 |
| 2014/0165254 | A1 * | 6/2014 | Bowen | A41D 7/008 2/69 |
| 2015/0114312 | A1 | 4/2015 | Cacopardo | |
| 2015/0313183 | A1 * | 11/2015 | Lerner | A01K 13/006 119/850 |
| 2017/0042262 | A1 * | 2/2017 | Johnson | A47K 10/02 |

FOREIGN PATENT DOCUMENTS

| | | | | |
|---|---|---|---|---|
| GB | 2438460 A | * | 11/2007 | ........... A01K 13/001 |
| JP | 3107336 | | 2/2005 | |
| KR | 10-2006-0074005 | | 6/2006 | |
| KR | 10-2019-0098568 | | 8/2019 | |
| WO | WO03/086122 | | 10/2003 | |

* cited by examiner

TOWEL FOR DRYING AN ANIMAL

RELATED APPLICATIONS

This application claims priority to and the benefit of the filing date of provisional U.S. Patent Application No. 63/040,504 entitled "Towel with Extensions," filed Jun. 17, 2020, and PCT Application No. PCT/US2021/37718 entitled "Towel with Extensions," filed Jun. 17, 2021, the entire contents of each of which is hereby expressly incorporated herein by reference.

BACKGROUND OF THE DISCLOSURE

Field of Technology

This invention relates generally to towels, and in particular to towels having multiple extensions protruding from a center portion. The multiple extensions being selected from the group consisting of one or more extension panels and/or one or more towel tubes for drying extensions of an object, e.g., a person's or animal's leg.

Related Art

Conventional towels are generally rectangular in shape and a continual piece of an absorbent fabric that are not optimal for drying an object having protruding extensions. For example, when drying a dog's legs, the towel is limited by its contiguous rectangular shape. When placed over a dog for drying, the towel is pulled away from other parts of the dog in order to get enough surface area of the towel to wrap around and dry a leg. This leaves other parts of the dog exposed and/or results in the same part(s) of the towel being used in the drying process. As another example, often times the dog steps on the towel while being dried, thereby preventing the towel from reaching and drying remote parts of the dog. Accordingly, there is a need for a towel that has one or more extensions for drying parts of an object while the remainder of the towel stays in place to cover and/or dry other parts of the same object.

DESCRIPTION OF THE FIGURES

The present invention is described with reference to the accompanying drawings. In the drawings, like reference numbers indicate identical or functionally similar elements. Additionally, the left-most digit(s) of a reference number identifies the drawings in which the reference number first appears.

DETAILED DESCRIPTION

Figure 1:
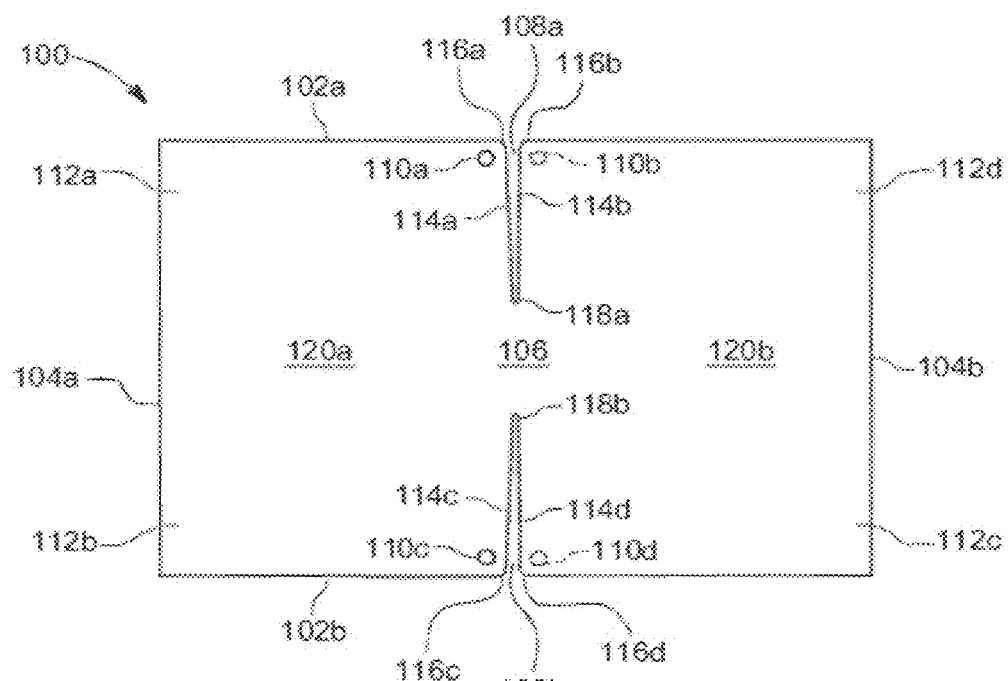
FIG. 1 is a top view of a towel of the present invention.

FIG. 1 is a top view of a towel 100 of the present invention. The towel 100 is made of an absorbent cloth and generally rectangular in shape when flattened, but this is for convenience. The towel 100 could be any polygon, including being generally square in shape, or even a circular or oval shape. The representative towel 100 has a first side 102a and an opposing second side 102b, a third side 104a and an opposing fourth side 104b. The towel 100 can be of any size as needed for the target object to be dried, including 2'×3', 3'×6', or any desired dimension. The towel 100 is divided into two extensions 120a, 120b. As shown in FIG. 1, a first extension 120a has a first extension panel 112a and a second extension panel 112b, and a second extension 120b has a third extension panel 112c and a fourth extension panel 112d, all of which extend from a center portion 106 of the towel. The center portion 106 is located at the center of the towel 100 and has a general width (with an axis parallel to the third side 104a and fourth side 104b) and a general length (with an axis parallel to the first side 102a and second side 102b) defining a region centrally located in the towel 100.

In this representative towel 100, the first and fourth extension panels 112a, 112d are created by a first slit 108a cut from the first side 102a toward the center portion 106 and ending at a first center point 118a, creating a first inner edge 114a and a second inner edge 114b, and the second and third extension panels 112b, 112c are created by a second slit 108b cut from the second side 102b toward the center portion 106 and ending at a second center point 118b, creating a third inner edge 114c and a fourth inner edge 114d. Each slit, 108a and 108b, are located generally in the center of the first side 102a and second side 102b respectively, but this is for convenience. A slit 108a, 108b can be offset within the first side 102a or second side 102b to create extension panels 112a-d of non-uniform size.

The distance between the first center point 118a and the second center point 118b (i.e., the width of the center portion 106) is sufficient enough to not tear when the towel 100 is in use. In example embodiments, the distance between the first center point 118a and the second center point 118b is at least about 5-15% of the total width of the towel 100 (i.e., the length of the third side 104a or fourth side 104b), at least about 1-3 inches, or any distance in which the length of the first slit 108a or second slit 108b is greater than the width of the center portion 106 (the distance of the center portion 106 between the first center point 118a and the second center point 118b). In a representative embodiment the distance between the first center point 118a and the second center point 118b is generally equal to the distance extending from the top of a dog's left front leg, across the dog's back, to the top of the dog's second front leg.

Optionally, the distal end of each inner edge 114a-d may have a means for securing two extension panels. For example, first distal end 116a may have a first means for securing 110*a* while second distal end 116*b* has the corresponding second means for securing 110*b*, such that the first means for securing 110*a* and the second means for securing 110*b* are removably connectable. The first means for securing 110*a* and second means for securing 110*b* are selected from the group consisting of hook and loop fasteners (i.e., Velcro®), hook and eye fasteners, button and buttonhole, snaps, hooks, and the like. In operation, the first extension panel 112*a* can be secured to the fourth extension panel 112*d* by connecting the first means for securing 110*a* on the first distal end 116*a* with the second means for securing 110*b* on the second distal end 116*b*. Similarly, the second extension panel 112*b* can be secured to the third extension panel 112*c* by connecting the first means for securing 110*c* on the third distal end 116*c* with the second means for securing 110*d* on the fourth distal end 116*d*. With the extension panels 112*a*, 112*c* secured together and extension panels 112*b*, 112*d* secured together, the towel 100 has the flexibility to function as a conventional towel when desired as well as function with the extension panels 112*a*, 112*c* being used independently when the extension panels 112*a*, 112*c* are not secured together, and likewise extension panels 112*b*, 112*d* can be used independently when extension panels 112*b*, 112*d* are not secured together.

Alternatively, the means for securing can extend along a portion of or the entire length of an inner edges 114*a-d*. Thus, the first slit 108*a* and the second slit 108*b* can each be open or closed as desired, e.g., along the entire length, or one or more sections, of the slits 108(*a*), 108(*b*).

Figure 2:
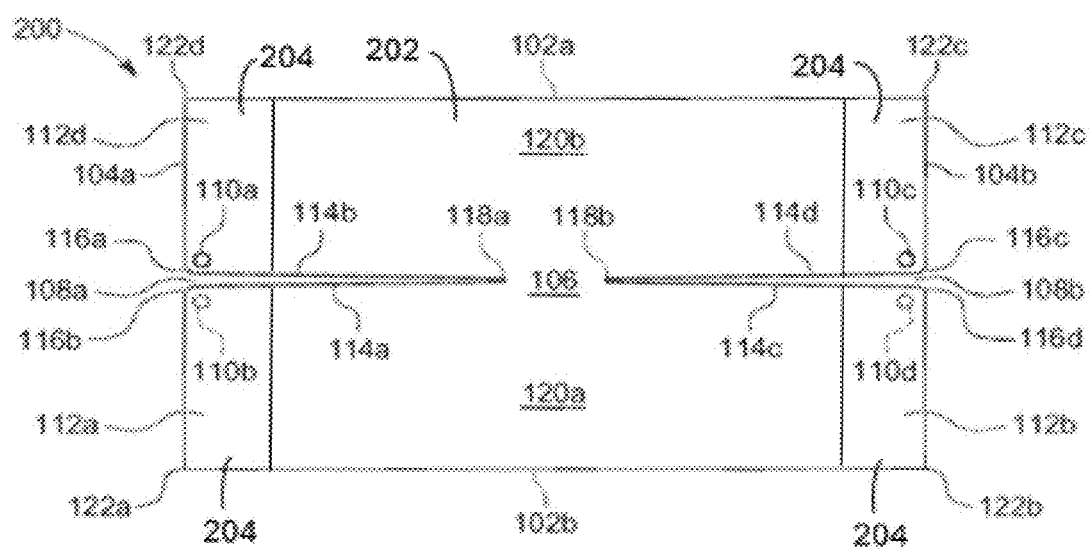
FIG. 2 is a top view of the towel of the present invention.

FIG. 2 is a top view of the towel 200 of the present invention with first side 102*a* having a distal end 122*c* and distal end 122*d*, and second side 102*b* having distal end 122*a* and 122*b*. The first extension 120*a* has a first extension panel 112*a* (with distal end 122*a* and second distal end 116*b*) and a second extension panel 112*b* (with distal end 122*b* and fourth distal end 116*d*), and the second extension 120*b* has a third extension panel 112*c* (with distal end 122*c* and third distal end 116*c*) and a fourth extension panel 112*d* (with distal end 122*d* and first distal end 116*a*), all of which extend from a center portion 106 of the towel. The first extension panel 112*a* and the fourth extension panel 112*d* are created by a first slit 108*a* cut from the third side 104*a* toward the center portion 106 and ending at a first center point 118*a*, creating a first inner edge 114*a* and a second inner edge 114*b*. The second extension panel 112*b* and the third extension panel 112*c* are created by a second slit 108*b* cut from the fourth side 104*b* toward the center portion 106 and ending at a second center point 118*b*, creating a third inner edge 114*c* and a fourth inner edge 114*d*.

In this embodiment, the distance between the first center point 118*a* and the second center point 118*b* is at least about 5-15% of the length of the towel 200 (i.e., the length of first side 102*a* or second side 102*b*), at least about 1-3 inches, or any distance in which the length of the first slit 108*a* or second slit 108*b* is greater than the length of the center portion 106 which is the distance of the center portion 106 between the first center point 118*a* and the second center point 118*b*. In a representative embodiment of FIG. 2 when the towel 200 is placed over a dog, the first center point 118*a* and the second center point 118*b* are aligned approximately at the bottom of the dog's torso or underside. Alternatively, when the towel 200 is placed over a dog, the first center point 118*a* and the second center point 118*b* are aligned approximately half way between the back of the dog and the bottom of the dog's torso or underside.

In another embodiment of FIG. 2, the overall dimensions of the towel 200 is about 64" (length of first side 102*a* and second side 102*b*) by 36" (length of third side 104*a* and fourth side 104*b*). The width of the center portion 106 (i.e., the distance between first center point 118*a* and the second centerpoint 118*b*) is about 20" with each slit, 108*a* and 108*b*, being about 22" in length. Each slit 108*a*, 108*b* is generally centered along the third side 104*a* and fourth side 104*b* respectively. Further, each extension panel 112*a-d* is of such a length that when the towel 200 is placed on a dog (with the first slit 108*a* on one side of the dog and the second slit 108*b* on the opposite side of the dog), each extension panel 112*a-d* approximately reaches the ground, either touching the ground or just above the ground.

An alternative embodiment of the present towel 200 can optionally have an extension panel 112 with a different shape at the distal end of an extension panel 112*a-d*. As shown in the figures, the distal end of the extension panels 112*a-d* is square in shape, but this is for convenience. It would be readily apparent to have a towel 200 with the distal end of the extension panel 112*a-d* having an alternative shape, e.g., curved, pointed, triangular, and the like.

An alternative embodiment of the present towel 200 can optionally have a second type of material 204 at the distal end 116*a-d*, 122*a-d* of an extension panel 112*a-d*. This second material 204 may be of a type suitable for cleaning a dog's paw, e.g., having a textured surface, having a larger thickness, increased absorbency, and the like. Further, the entire distal end 116*a-d*, 122*a-d* of an extension panel 112*a-d* may be of a second material 204, or a second material 204 or pad may be secured to one side of the distal end 116*a-d*, 122*a-d* of an extension panel 112*a-d*. For convenience, the second material 204 may be positioned about 2"-6" above the outer edge of the distal end 116*a-d*, 122*a-d* of the extension panel 112*a-d*.

Figure 3:
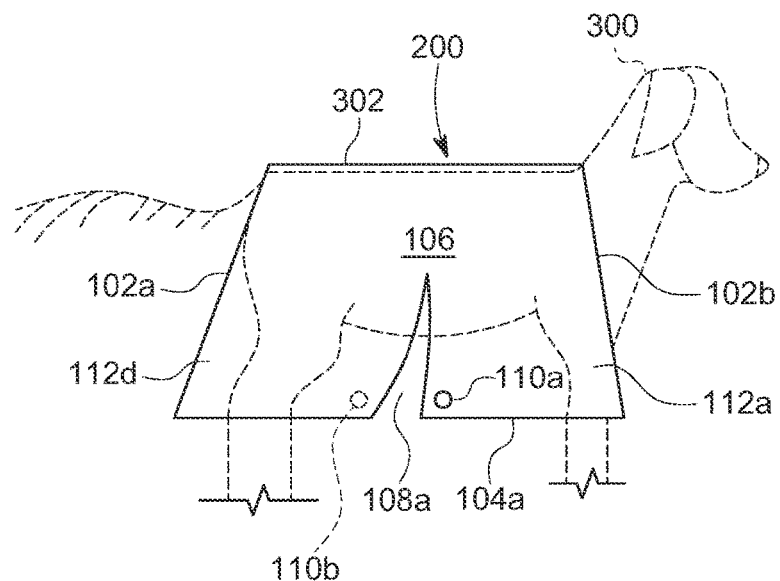
FIG. 3 is a side view of the towel of the present invention in use.

FIG. 3 is a side view of the towel 200 in use. The towel 200 is shown drying a dog 300 but this is for convenience. The towel 200 can be used to dry any object having extensions or parts that require independent movement of extension panels 112*a-d* to reach certain parts of the object. As shown, the towel 200 is draped over the dog generally along a center axis 302 of the towel 200 such that the third side 104*a* is on one side of the dog 300 and the fourth side 104*b* is on the opposing side of the dog 300. The first side 102*a* of the towel 200 extends over the back end of the dog 300 while the second side 102*b* of the towel 200 drapes over the neck and/or head of the dog 300 depending on the length of the towel 200.

In operation, the towel 200 is draped over an item, e.g., a dog 300, in the manner described with FIG. 3. With the means for securing 110*a-d* not connected, first and second extension panels 112*a*, 112*b* are used independently to dry the front legs of the dog 300 while the third and fourth extension panel 112*c*, 112*d* are used independently to dry the back two legs of the dog 300. When drying the dog 300, the four extension panels 112*a-d* are used independent of each other while the center portion 106 of the towel 200 remains generally on the top of the dog 300 and not pulled off during use.

Figure 4:
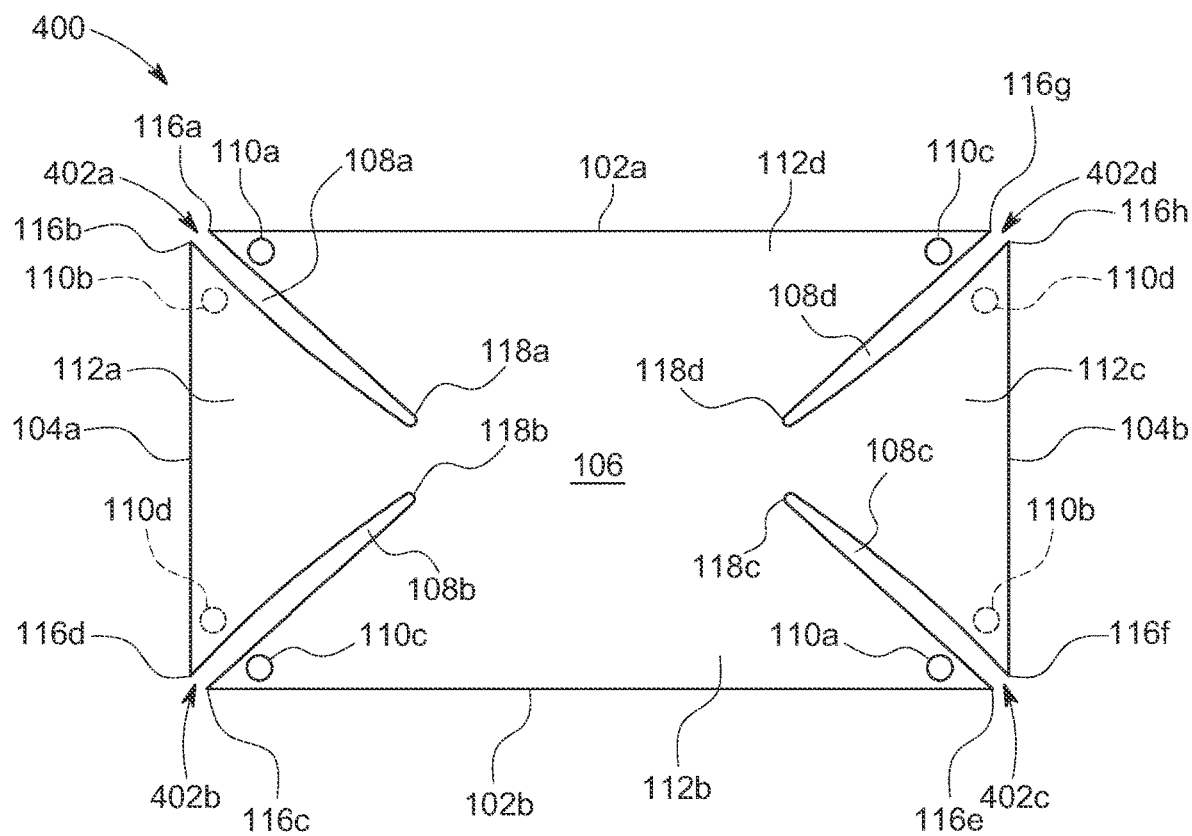
FIG. 4 is a top view of a towel of the present invention.

FIG. 4 is a top view of a towel 400 of the present invention having a first, second, third, and fourth extension panels 112*a-d* similar to FIGS. 1-3 except that the extension panels 112*a-d* are formed from the corners 402*a-d* of the towel 400. Towel 400 has multiple extensions 120*a-b*, such that first extension 120*a* is comprised of extension panel 112*a* and parts of extension panels 112*b*, 112*d*, and second extension 120*b* is comprised of extension panel 112*c*, and opposing parts of extension panels 112*b*, 112*d*. Each extension panel 112*a-d* being separated from an adjacent extension panel 112a-d by a first, second, third, and fourth slit 108a-d. In particular, a first slit 108a separates the first extension panel 112a from the fourth extension panel 112d; a second slit 108b separates the first extension panel 112a from the second extension panel 112b; a third slit 108c separates the second extension panel 112b from the third extension panel 112c; and a fourth slit 108d separates the third extension panel 112c from the fourth extension panel 112d. Each of the first, second, third, and fourth slits 108a-d are formed from a separate corner 402a-d of the towel 400 toward the center portion 106 ending at a first, second, third and fourth center point 118a-d. Optionally, each extension panel 112a-d is secured to an adjacent extension panel 112a-d by connecting the first means for securing 110a on a first distal end 116a, 116c, 116e, 116g with a second means for securing 110b on a second distal end 116b, 116d, 116f, 116h respectively.

Figure 5:
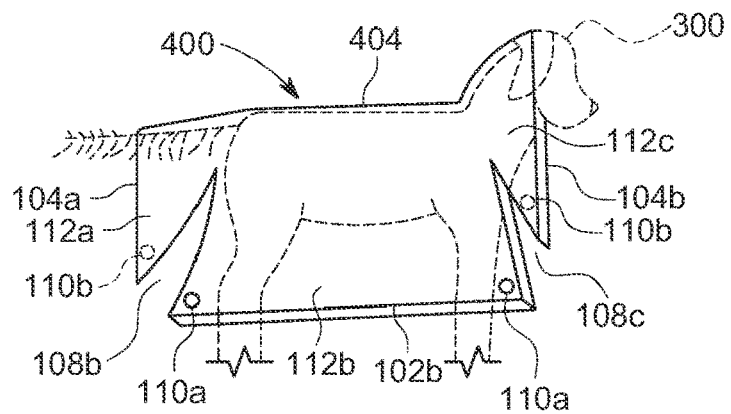
FIG. 5 is a side view of the towel of the present invention in use.

FIG. 5 is a side view of the towel 400 of the present invention in use. The towel 400 is shown drying a dog 300, but this is for convenience. The towel 400 can be used to dry any object having extensions or parts that require independent movement of four extension panels 112a-d to reach certain parts of the object. As shown, the towel 400 is draped over the dog generally along a center axis 404 of the towel 400 such that the first side 102a is on one side of the dog 300 and the second side 102b is on the opposing side of the dog 300. The third side 104a of the towel 400 extends over the back end of the dog 300 while the fourth side 104b of the towel 400 drapes over the neck and/or head of the dog 300 depending on the length of the towel 400. In an embodiment, the second extension panel 112b and the fourth extension panel 112d are sufficiently long to reach the paws of a dog. Further, the first extension panel 112a and third extension panel 112c are sufficiently long to cover a portion or all of a dog's tail and neck or head respectively.

In operation, the towel 400 is draped over an item, e.g., a dog 300, in the manner described with FIG. 4. With the means for securing 110a-h not connected, first extension panel 112a is used to dry the tail of the dog 300; the second extension panel 112b is used to dry a pair of side legs of the dog 300; the third extension panel 112c is used to dry the neck or head of the dog 300; and the fourth extension panel 112d is used to dry the opposing pair of side legs of the dog 300. When drying the dog 300, the four extension panels 112a-d are used independent of each other while the center portion 106 of the towel 400 remains generally on the top of the dog 300 and not pulled off during use.

Figure 6:
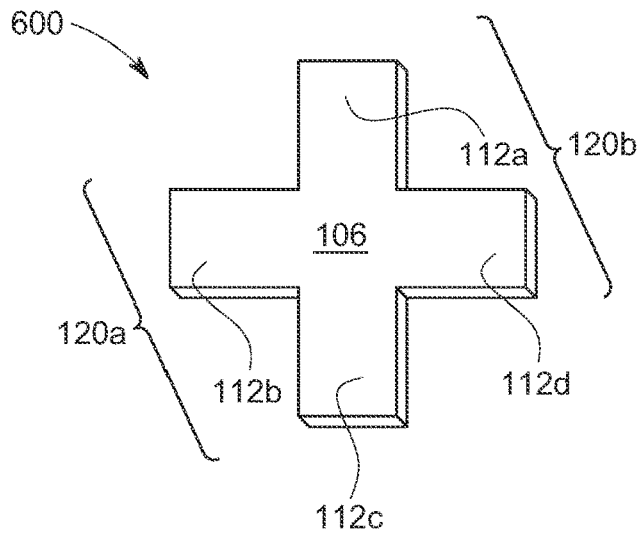
FIG. 6 is a top view of a towel of the present invention.

FIG. 6 is a top view of a towel 600 of the present invention having multiple extensions 120a-b, such that first extension 120a is comprised of extension panels 112b, 112c, and second extension 120b is comprised of extension panels 112a, 112d. Each extension panel 112a-d extends from the center portion 106, with adjacent extension panels being separated by a gap 602a formed from the shape of the towel 600. The shape of the towel 600 is generally a plus-sign shape, with each extension panel 112a-d having the same approximate length from the center portion 106 and four gaps 602a-d formed from the shape of the towel 600.

Figure 7:
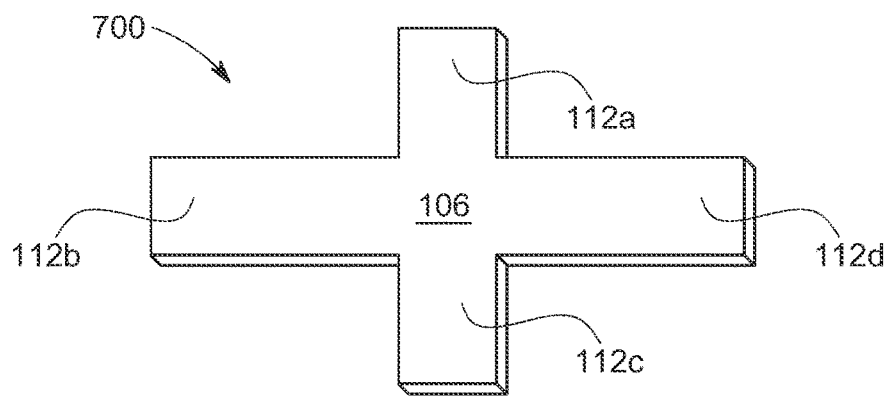
FIG. 7 is a top view of a towel of the present invention.

FIG. 7 is a top view of a towel 700 of the present invention that is similar to the towel 600 of FIG. 6 with two opposing extension panels (first extension panel 112a and third extension panel 112c) being shorter in length than the other two opposing extension panels (second extension panel 112b and fourth extension panel 112d).

Figure 8:
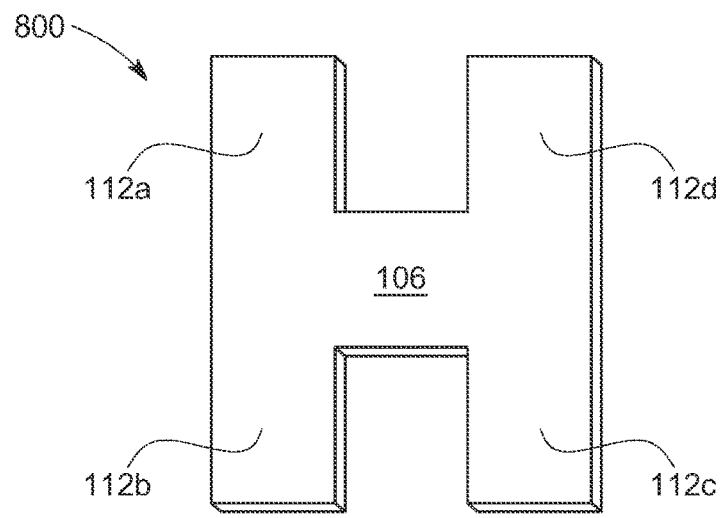
FIG. 8 is a top view of a towel of the present invention.

FIG. 8 is a top view of a towel 800 of the present invention that is similar to the towel 600 of FIG. 6, but with the towel 800 having a general H-shape, and the four extension panels 112a-d having the same approximate length from the center portion 106.

Figure 9:
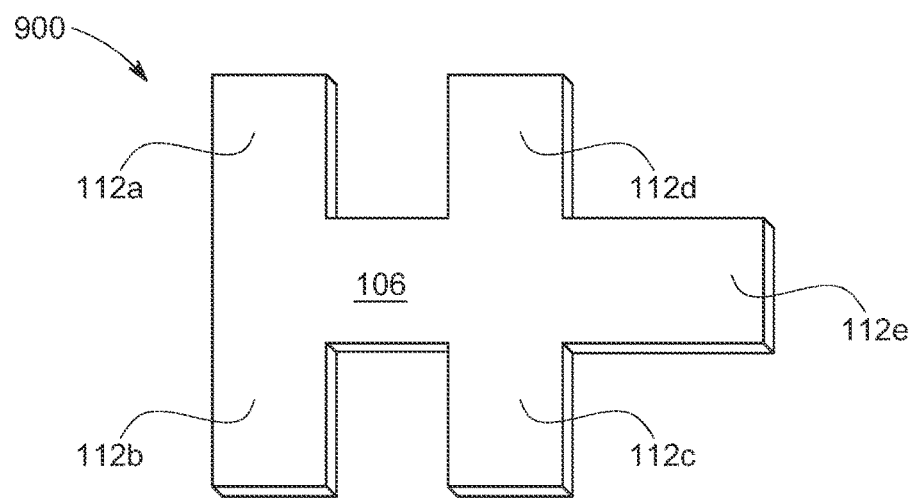
FIG. 9 is a top view of a towel of the present invention.

FIG. 9 is a top view of a towel 900 of the present invention that is similar to the towel 800 of FIG. 8 and having a general H-shape, but also having a fifth extension panel 112e.

Figure 10:
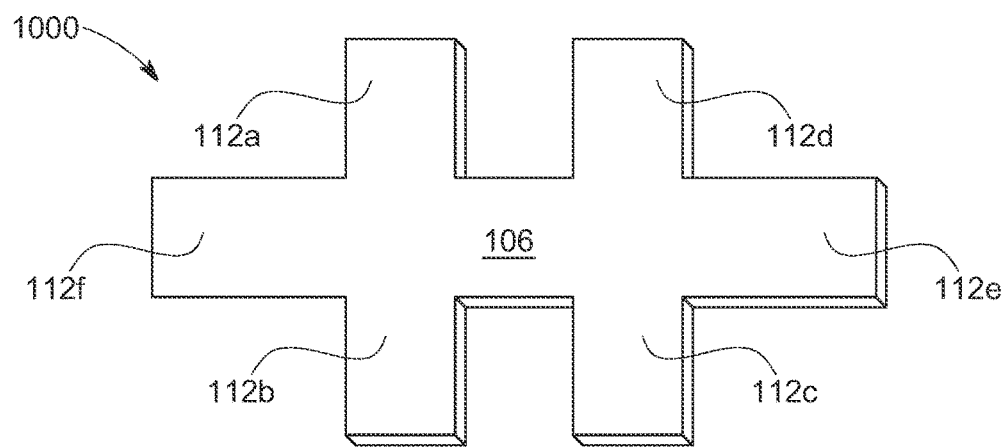
FIG. 10 is a top view of a towel of the present invention.

FIG. 10 is a top view of a towel 1000 of the present invention that is similar to the towel 900 of FIG. 9 and having a general H-shape, but also having a fifth extension panel 112e and a sixth extension panel 112f.

Figure 11:
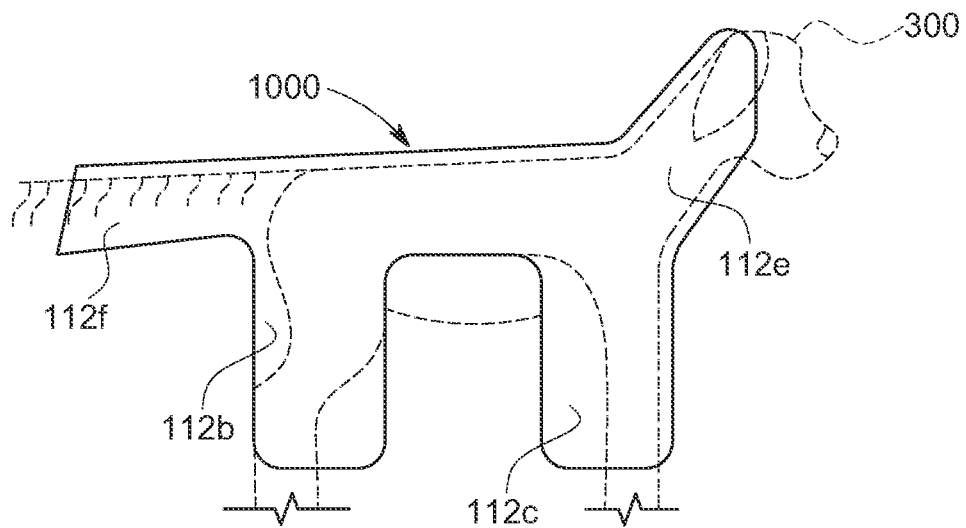
FIG. 11 is a side view of the towel of the present invention in use.

FIG. 11 is a view of the towel 1000 of the present invention in use with an object, e.g., a dog 300.

In FIGS. 6-10, the extension panels 112 may have any length. Further, each extension panel 112 of a given towel 600, 700, 800, 900, 1000, may have the same length, two or more different lengths, the same width, or two or more different widths. It would be readily apparent to one skilled in the art to design a towel 100, 200, 400, 600, 700, 800, 900, 1000 of the present invention of a sufficient size and shape to dry a dog or any animal or object requiring extension panels.

Figure 12:
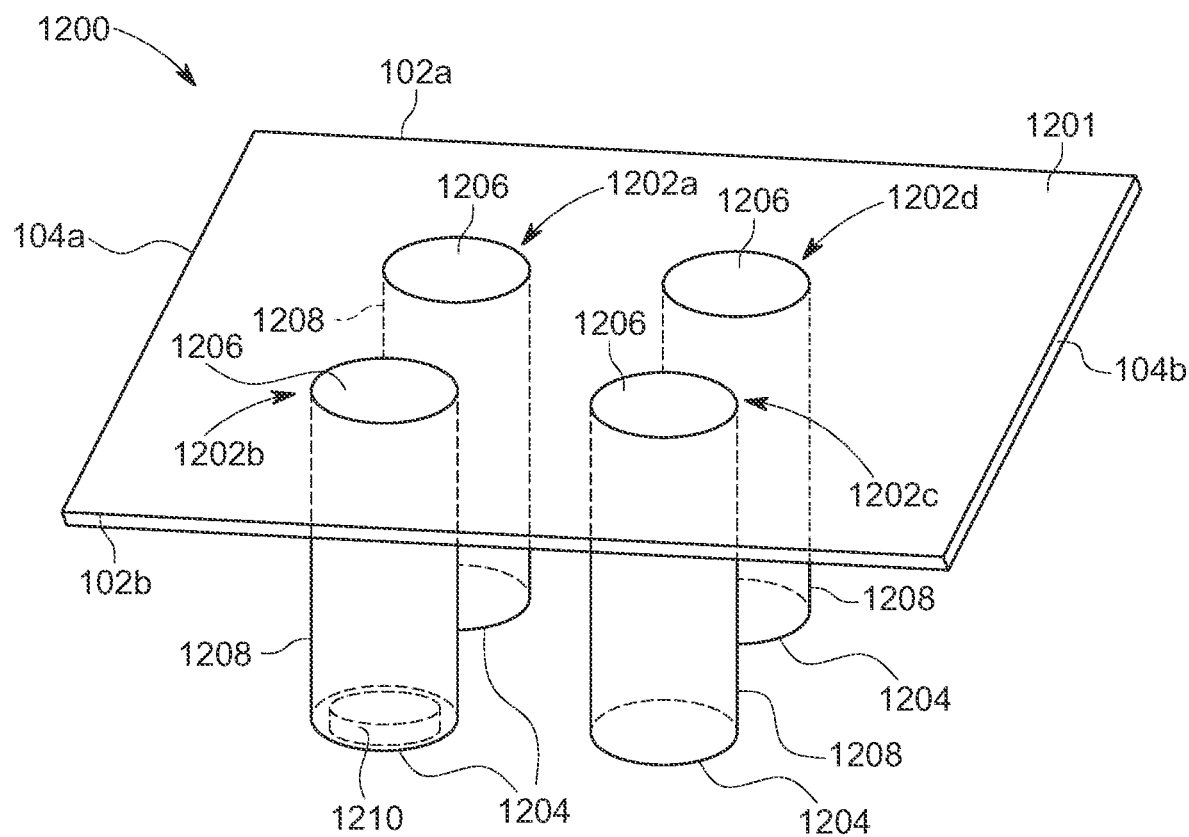
FIG. 12 is a perspective view of a towel of the present invention.

FIG. 12 is a perspective view of a towel 1200 of the present invention. The towel 1200 is a towel panel 1201 made of an absorbent cloth and generally rectangular in shape, but this is for convenience. The towel 1200 could be any polygon, including being generally square in shape. The representative towel 1200 has a first side 102a and an opposing second side 102b, a third side 104a and an opposing fourth side 104b. The towel 1200 has multiple extensions and as shown, the extensions are four extension tubes 1202a-d. A towel 1200 may have any number of extension tubes 1202a-d.

For convenience one extension tube, first extension tube 1202a, is described, but generally each extension tube 1202a-d has the same structure for convenience. First extension tube 1202a being an elongated tube 1208 having a first open end 1206 disposed within the towel 1200 and a second end 1204. The elongated tube 1208 can be formed of the same absorbent cloth of the towel panel 1201, but this is for convenience. The elongated tube 1208 can be formed of a different absorbent material than the towel panel 1201. The elongated tube 1208 may be any length, but has a preferred length of at least 3 inches. The second end 1204 of the elongated tube 1208 is either open or closed. Further, if the second end 1204 of the elongated tube 1208 is closed, the Internal surface may have a tube pad 1210 of the size and shape to fit within the second end 1204. For example, the tube pad 1210 may be generally a disk shape and made of a cushion, foam, rubber, or absorbent material. Alternatively, the second end 1204 may incorporate a design element to facilitate locating the closed end 1204 or drying an animal's paw. The design element may be selected from the group consisting of: a pad, an image, a color, a textured surface, and a material different from the towel 1200. The length and width of an elongated tube 1202a is preferably of a size so that a dog's leg can be disposed within the elongated tube 1208. In one embodiment the elongated tube 1208 is about 8 inches in diameter and 8 inches in length. Further, the elongated tube 1208 can have a uniform diameter from the open end 1206 to the second end 1204. However, in alternative embodiments, the elongate tube 1208 may have a tapered diameter such that the diameter of the open end 1206 is larger than the diameter of the second end 1204.

Figure 13:
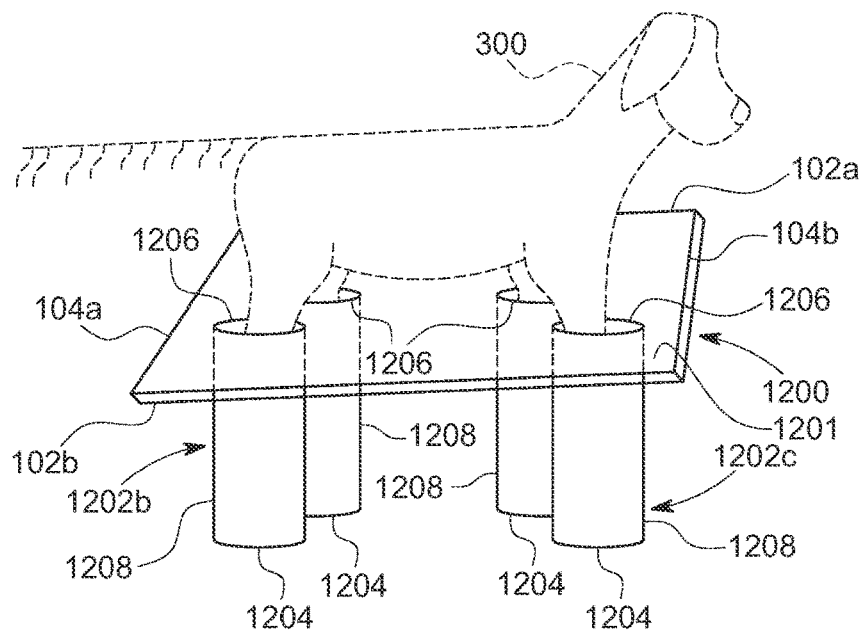
FIG. 13 is a perspective view of the towel of the present invention in use.

FIG. 13 is a perspective view of the towel 1200 of the present invention in use. The towel 1200 is shown drying a dog 300, but this is for convenience. The towel 1200 can be used to dry any object having extensions or parts that require independent movement of four extension extensions, i.e., extension tubes 1202a-d reach certain parts of the object. As shown, the dog is positioned in the towel 1200 such that each leg of the dog 300 is disposed within an extension tube 1202a-d and the towel panel 1201 is positioned under the dog 300. When drying the dog 300, each leg of the dog 300 is dried by the extension tube 1202a-d in which the leg is disposed, and the remainder of the dog 300 is dried by the towel panel 1201. This allows the legs of the dog 300 to be dried independent of the remainder of the dog 300 such that the towel 1200 is not pulled off during use. If the second end 1204 of an extension tube 1202a-d is open, then the paw of the dog's 300 leg disposed in the extension tube 1202a-b may protrude thru the extension tube 1202a-d. Alternatively, if the second end 1204 of an extension tube 1202a-d is closed, then the paw of the dog's 300 leg disposed in the extension tube 1202a-b will not protrude thru the extension tube 1202a-d and can be dried by the material of the second end 1204 or by the pad 1210 disposed within the second end 1204.

Figure 14:
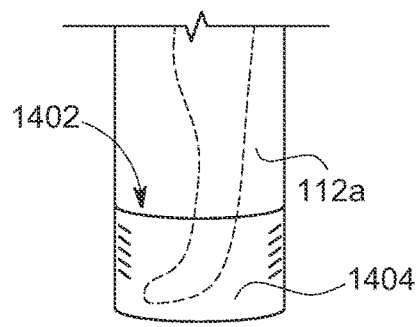
FIG. 14 is a side view of a pocket of the towel of the present invention in use.

An alternative embodiment of the present towel 200 can optionally have a pocket at the distal end of an extension panel 112a-d. FIG. 14 is a side view of representative pocket 1402 formed from a pocket panel 1404 at the end of first extension panel 112a. The pocket panel 1404 can be a separate piece of fabric sewn or otherwise secured on three sides to the end of first extension panel 112a, leaving an opening at the top of the pocket panel 1404 to form pocket 1402. Alternatively, the pocket panel 1404 is the distal end of the first extension panel 112a folded up toward the center portion 106 and sewn or secured on two sides to form pocket 1402. The pocket 1402 is formed so that it opens to the interior of the towel 200 in use (the side that lays against the dog). As shown in FIG. 14, a dog's paw can fit within the pocket 1402 when the towel 200 is in use, to provide a means for containing the paw and facilitate the drying or cleaning process.

Figure 15:
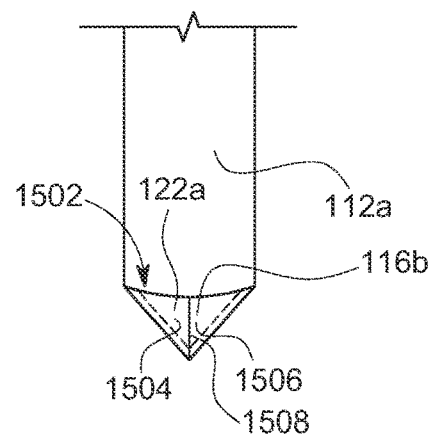
FIG. 15 is a side view of an alternate pocket of the towel of the present invention.

FIG. 15 is a side view of an alternate pocket 1502 of the towel of the present invention. In this embodiment, the pocket 1502 is formed at the distal end of the first extension panel 112a by joining distal end 122a and second distal end 116b, securing the edges along seam 1508 by sewing or other means. The pocket 1502 is created by fabric from a first portion 1504 and second portion 1506 of the first extension panel 112a. It would be readily apparent to one skilled in the art to design a towel 100, 200, 400, 600, 700, 800, 900, 1000 of the present invention having a pocket 1502 of the appropriate size for accommodating a dog's paw.

A towel 100, 200, 600, 700, 800, 900, and 1000 of the present invention can be made with a pocket 1402, 1502 on one or more extension panels 112a-f. Further, a pocket 1402, 1502 can be made of the same fabric as the towel 100, 200, 600, 700, 800, 900, and 1000, or optionally, can be made of a second fabric or material 1606 suitable for cleaning a dog's paw. The entire pocket 1402, 1502 can be made of a second fabric or material 1606, or the interior of a pocket 1402, 1502 can be a second fabric 1606 or have an insert of a different material 1606 or pad.

Figure 16:
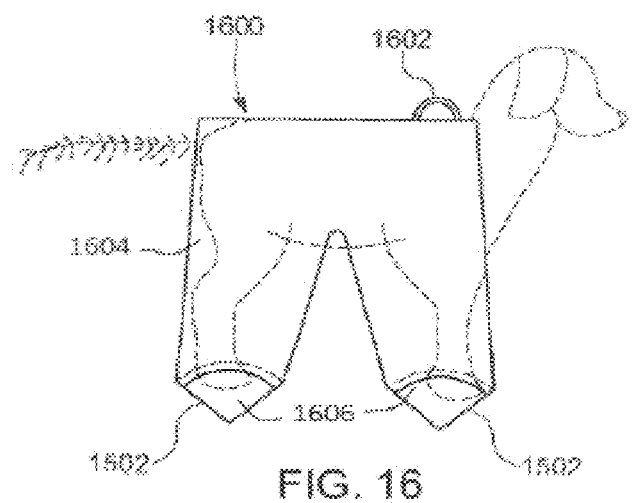
FIG. 16 is a side view of the towel with pockets of the present invention in use.

FIG. 16 is a side view of a towel 1600 with multiple pockets 1502 of the present invention in use on a dog. The extension panels 112a-d of the towel 1600 are of such a length that when the towel 1600 is placed over the dog, the dog's paw easily fits within a pocket 1602 without pulling the center portion 106 of the towel 1600. The towel 1600 also has a loop 1602 on the external side of the towel 1600 (the side not against the dog) near the center portion 106, however this is for convenience and the loop 1602 can be located anywhere on the towel 1600. The loop 1602 can be made of fabric or other material and is of a sufficient size for hanging the towel 1600 to dry on a hook. The loop 1602 also provides a visual clue to the user for orienting the towel 1600 on a dog quickly. Other visual clues for orienting the towel during use may include using different colors or patterns or indicators on different parts of the towel, such as using a first color on the edge (or portion of the edge) of the first side 102 or second side 102b and/or a second color on the edge (or portion of the edge) of the third side 102c or fourth side 102d.

Figure 17:
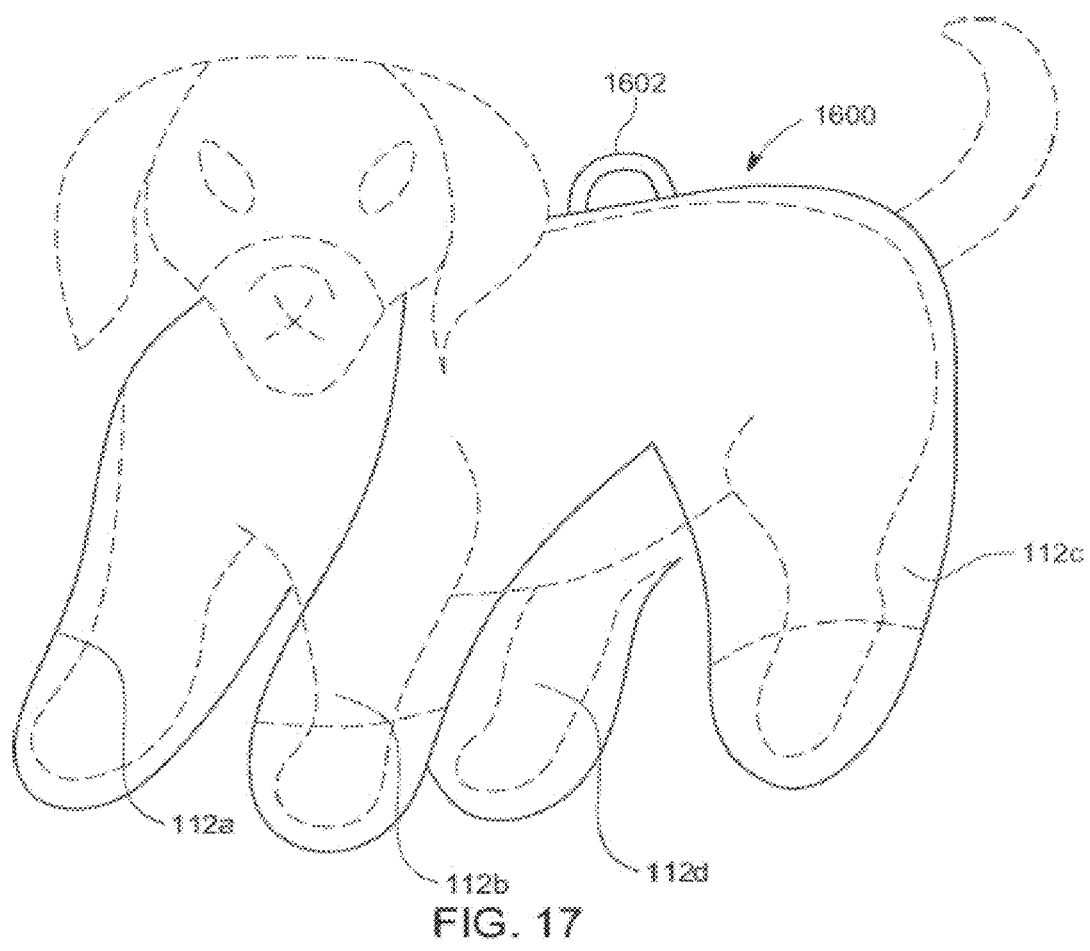
FIG. 17 is a perspective view of the towel with pockets of the present invention in use.

FIG. 17 is a perspective view of the towel 1600 with pockets 1502 of the present invention in use on a dog, with the dog's paws in the pockets 1502.

While various embodiments of the present invention have been described above, it should be understood that they have been presented by the way of example only, and not limitation. It will be understood by those skilled in the art that various changes in form and details may be made therein without departing from the spirit and scope of the invention as defined. Thus, the breadth and scope of the present invention should not limit by any of the above-described exemplary embodiments.

What is claimed is:

1. A towel for drying an animal having four legs, comprising:
    a generally rectangular swatch of fabric, comprising:
        a center portion centrally located in the towel;
        a first extension panel and a second extension panel formed by a first slit extending from the center portion to a general midpoint of a first side of the towel; and
        a third extension panel and a fourth extension panel formed by a second slit extending from the center portion to a general midpoint of a second side of the towel;
        wherein the first side of the towel is opposite the second side of the towel and the first slit is opposite the second slit,
    wherein each of the first extension panel, second extension panel, third extension panel, and fourth extension panel are separate and independently movable and are generally equal lengths;
    wherein said swatch of fabric is a water absorbing material; and
    wherein at least one of a distal end of the first extension panel, second extension panel, third extension panel, and fourth extension panel is made of a second material.

2. The towel of claim 1, further comprising:
    a first fastener on a distal end of the first extension panel; and
    a second fastener on a distal end of the second extension panel,
    wherein the first fastener and the second fastener are removably connectable.

3. The towel of claim 1, further comprising:
    a first fastener along a portion of an inner edge of the first slit; and
    a second fastener along a portion of an opposing inner edge of the first slit,
    wherein the first fastener and the second fastener are removably connectable.

4. The towel of claim 1, further comprising a loop adapted for hanging up the towel.

5. The towel of claim 1, wherein the towel is manufactured using one three or more materials.

6. The towel of claim 1, wherein at least one of a distal end of the first extension panel, second extension panel, third extension panel, and fourth extension panel comprises a pocket adapted for receiving a foot of the animal when the towel is draped over the animal in a standing position with the first slit being generally positioned between a first front leg and a first hind leg of a first side of the animal and the second slit being generally positioned between a second front leg and a second hind leg of a second side of the animal.

7. The towel of claim 6, wherein the towel is made of a first material and the at least one pocket is made of e the second material.

8. The towel of claim 6, wherein each of the distal ends of the first extension panel, second extension panel, third extension panel, and fourth extension panel comprises a pocket adapted for receiving a foot of the animal when the towel is draped over the animal in a standing position with the first slit being generally positioned between a first front leg and a first hind leg of a first side of the animal and the second slit being generally positioned between a second front leg and a second hind leg of a second side of the animal, with each pocket adapted to receive a separate foot of the animal.

9. The towel of claim 1, wherein the generally rectangular swatch of fabric has a minimum length of about three feet and a minimum width of about two feet.

10. The method of claim 1, wherein the second material is selected from the group consisting of: a material with a textured surface, a material having a larger thickness than the first material, a material having increased absorbency than the first material, and a pad.

11. The towel of claim 1, further comprising:
wherein the first slit terminates at a first center point in the center portion and the second slit terminates at a second center point in the center portion; and
wherein a distance between the first center point and the second center point is selected from the group consisting of: at least about 5-15% of a width of the towel, at least about 1-3 inches, or less than a length of the first slit.

12. A method for drying an animal having four legs with a towel, comprising:
draping a towel over a back of the animal in the standing position, the towel comprising:
a generally rectangular swatch of fabric made of a first material having the ability to absorb water, comprising:
a center portion centrally located in the towel,
a first extension panel and a second extension panel extending from the center portion and formed by a first slit being generally positioned between a first front leg and a first hind leg of a first side of the animal, a third extension panel and a fourth extension panel extending from the center portion and formed by a second slit being generally positioned between a second front leg and a second hind leg of a second side of the animal,
wherein each of the first extension panel, second extension panel, third extension panel, and fourth extension panel are separate and independently movable, are generally equal lengths, and at least one of a distal end of the first extension panel, second extension panel, third extension panel, and fourth extension panel is made of a second material, and
wherein the first extension panel extends from the center portion alongside the first leg of the animal, the second extension panel extends from the center portion alongside the second leg of the animal, the third extension panel extends from the center portion alongside the third leg of the animal, and the fourth extension panel extends from the center portion alongside the fourth leg of the animal;
drying a first leg of the animal with the first extension panel;
drying a second leg of the animal with the second extension panel;
drying a third leg of the animal with the third extension panel;
drying a fourth leg of the animal with the fourth extension panel; and
drying at least one foot of the animal with the second material of at least one of a distal end of the first extension panel, second extension panel, third extension panel, and fourth extension panel.

13. The method of claim 12, wherein at least one of a distal end of the first extension panel, second extension panel, third extension panel, and fourth extension panel comprises a pocket adapted for receiving a foot of the animal.

14. The method of claim 13 further comprising placing the at least one foot of the animal into the at least one pocket.

15. The method of claim 14, wherein the drying the at least one foot of the animal occurs in the at least one pocket.

16. The method of claim 13, wherein the towel is made of the first material and the pocket is made of the second material.

17. The method of claim 13, wherein at least one side of the pocket is made of the second material.

18. The method of claim 13 wherein each of the distal ends of the first extension panel, second extension panel, third extension panel, and fourth extension panel comprises a pocket adapted for receiving a foot of the animal, with each pocket adapted to receive a separate foot of the animal, the method further comprising:
drying a first foot of the animal with a first pocket at the distal end of the first extension panel;
drying a second foot of the animal with a second pocket at the distal end of the second extension panel;
drying a third foot of the animal with a third pocket at the distal end of the third extension panel; and
drying a fourth foot of the animal with a fourth pocket at the distal end of the fourth extension panel.

19. The method of claim 12, further comprising drying the abdomen of the animal with the first extension panel.

20. The method of claim 12, wherein the second material is selected from the group consisting of: a material with a textured surface, a material having a larger thickness than the first material, a material having Increased absorbency than the first material, and a pad.

* * * * *